United States Patent
Ahopelto et al.

(10) Patent No.: US 8,473,494 B2
(45) Date of Patent: Jun. 25, 2013

(54) METHOD AND ARRANGEMENT FOR ADDING DATA TO MESSAGES

(75) Inventors: Timo Ahopelto, Helsinki (FI); Teemu Ikonen, Espoo (FI)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 12/744,872

(22) PCT Filed: Dec. 22, 2008

(86) PCT No.: PCT/EP2008/068200
§ 371 (c)(1),
(2), (4) Date: Apr. 12, 2011

(87) PCT Pub. No.: WO2009/080819
PCT Pub. Date: Jul. 2, 2009

(65) Prior Publication Data
US 2011/0184957 A1    Jul. 28, 2011

(30) Foreign Application Priority Data
Dec. 21, 2007  (GB) .................................. 0724872.7

(51) Int. Cl.
G06F 17/30 (2006.01)
(52) U.S. Cl.
USPC ............ 707/736; 707/758; 707/922; 709/207
(58) Field of Classification Search
USPC ............. 707/922, 944, 965, 999.01, 999.107, 707/736, 758; 709/203, 207, 240; 705/14.69, 705/14.72
See application file for complete search history.

(56) References Cited

U.S. PATENT DOCUMENTS
5,408,519 A    4/1995    Pierce et al.
(Continued)

FOREIGN PATENT DOCUMENTS
DE    199 41 461 A1    3/2001
(Continued)

OTHER PUBLICATIONS

PCT International Search Report and PCT Written Opinion issued by PCT International Searching Authority and mailed Apr. 7, 2009 in connection with the related PCT International Application No. PCT/EP2008/068200 (7 pages).

(Continued)

*Primary Examiner* — Leslie Wong
(74) *Attorney, Agent, or Firm* — Novak Druce Connolly Bove + Quigg LLP (57) ABSTRACT

The invention relates to a solution for adding a data item, e.g. advertisement information, to a message. The solution comprises a server (102) and a database (101). The database includes a pre-defined set of data items and a pre-defined set of profile items. The server selects one profile item on the basis of transmission control data, e.g. a destination address, associated with the message. The server selects a data item on the basis of the selected profile item and adds the selected data item on the basis data item to the message. Profiling of e.g. recipients associated with different instances of transmission control data has been done in advance and the results are stored in the database in the form of the profile items. Therefore, the amount of work related to selection of an appropriate data item for a certain message is reduced. In a preferred embodiment data items are selected at least partly on the basis of remaining portions of validity periods of the data items associated with the selected profile item, a shorter remaining portion of validity period being a factor in favor of getting selected compared with a longer remaining portion of validity period.

32 Claims, 4 Drawing Sheets

U.S. PATENT DOCUMENTS

| | | | |
|---|---|---|---|
| 5,613,213 | A | 3/1997 | Naddell et al. |
| 5,978,775 | A | 11/1999 | Chen |
| 5,978,833 | A | 11/1999 | Pashley et al. |
| 6,023,700 | A | 2/2000 | Owens et al. |
| 6,097,942 | A | 8/2000 | Laiho |
| 6,205,432 | B1 | 3/2001 | Gabbard et al. |
| 6,334,145 | B1 | 12/2001 | Adams et al. |
| 6,345,279 | B1 | 2/2002 | Li et al. |
| 6,381,465 | B1 | 4/2002 | Chern et al. |
| 6,405,243 | B1 | 6/2002 | Nielsen |
| 6,684,249 | B1 | 1/2004 | Frerichs et al. |
| 6,920,326 | B2 | 7/2005 | Agarwal et al. |
| 7,072,947 | B1 | 7/2006 | Knox et al. |
| 7,149,537 | B1 | 12/2006 | Kupsh et al. |
| 2002/0052925 | A1* | 5/2002 | Kim et al. ............... 709/217 |
| 2002/0077130 | A1 | 6/2002 | Owensby |
| 2002/0083411 | A1 | 6/2002 | Bouthors et al. |
| 2002/0137507 | A1 | 9/2002 | Winkler |
| 2002/0138291 | A1 | 9/2002 | Vaidyanathan et al. |
| 2003/0003935 | A1 | 1/2003 | Vesikivi et al. |
| 2003/0023973 | A1* | 1/2003 | Monson et al. ............ 725/34 |
| 2003/0040297 | A1 | 2/2003 | Pecen et al. |
| 2003/0040300 | A1 | 2/2003 | Bodic et al. |
| 2003/0120766 | A1* | 6/2003 | Ishiyama et al. ......... 709/223 |
| 2003/0154300 | A1 | 8/2003 | Mostafa |
| 2003/0188017 | A1 | 10/2003 | Nomura |
| 2003/0191689 | A1 | 10/2003 | Bosarge et al. |
| 2003/0197719 | A1 | 10/2003 | Lincke et al. |
| 2004/0043777 | A1 | 3/2004 | Brouwer et al. |
| 2004/0054576 | A1 | 3/2004 | Kanerva et al. |
| 2004/0136358 | A1 | 7/2004 | Hind et al. |
| 2004/0185883 | A1 | 9/2004 | Rukman |
| 2004/0192359 | A1 | 9/2004 | McRaild et al. |
| 2004/0203761 | A1 | 10/2004 | Baba et al. |
| 2004/0203851 | A1 | 10/2004 | Vetro et al. |
| 2004/0204133 | A1 | 10/2004 | Andrew et al. |
| 2004/0209649 | A1 | 10/2004 | Lord |
| 2004/0240649 | A1 | 12/2004 | Goel |
| 2004/0259526 | A1 | 12/2004 | Goris et al. |
| 2005/0010641 | A1 | 1/2005 | Staack |
| 2005/0060425 | A1 | 3/2005 | Yeh et al. |
| 2005/0125397 | A1 | 6/2005 | Gross et al. |
| 2005/0249216 | A1 | 11/2005 | Jones |
| 2005/0289113 | A1 | 12/2005 | Bookstaff |
| 2006/0031327 | A1 | 2/2006 | Kredo |
| 2006/0095511 | A1 | 5/2006 | Munarriz et al. |
| 2006/0123014 | A1 | 6/2006 | Ng |
| 2006/0129455 | A1 | 6/2006 | Shah |
| 2006/0141923 | A1 | 6/2006 | Goss |
| 2006/0194595 | A1 | 8/2006 | Myllynen et al. |
| 2006/0200460 | A1 | 9/2006 | Meyerzon et al. |
| 2006/0200461 | A1 | 9/2006 | Lucas et al. |
| 2006/0206586 | A1 | 9/2006 | Ling et al. |
| 2006/0276170 | A1 | 12/2006 | Radhakrishnan et al. |
| 2006/0276213 | A1 | 12/2006 | Gottschalk et al. |
| 2006/0286963 | A1 | 12/2006 | Koskinen et al. |
| 2006/0286964 | A1 | 12/2006 | Polanski et al. |
| 2006/0288124 | A1 | 12/2006 | Kraft et al. |
| 2007/0004333 | A1 | 1/2007 | Kavanti |
| 2007/0047523 | A1 | 3/2007 | Jiang |
| 2007/0072631 | A1 | 3/2007 | Mock et al. |
| 2007/0074262 | A1 | 3/2007 | Kikkoji et al. |
| 2007/0083602 | A1 | 4/2007 | Heggenhougen et al. |
| 2007/0088687 | A1 | 4/2007 | Bromm et al. |
| 2007/0088801 | A1* | 4/2007 | Levkovitz et al. ......... 709/217 |
| 2007/0088851 | A1 | 4/2007 | Levkovitz et al. |
| 2007/0100805 | A1 | 5/2007 | Ramer et al. |
| 2007/0105536 | A1 | 5/2007 | Tingo, Jr. |
| 2007/0117571 | A1 | 5/2007 | Musial |
| 2007/0149208 | A1 | 6/2007 | Syrbe et al. |
| 2007/0290787 | A1 | 12/2007 | Fiatal et al. |
| 2008/0004046 | A1 | 1/2008 | Mumick et al. |
| 2008/0013537 | A1 | 1/2008 | Dewey et al. |
| 2008/0032703 | A1 | 2/2008 | Krumm et al. |
| 2008/0070579 | A1 | 3/2008 | Kankar et al. |
| 2008/0071875 | A1 | 3/2008 | Koff et al. |
| 2008/0082686 | A1 | 4/2008 | Schmidt et al. |
| 2008/0243619 | A1 | 10/2008 | Sharman et al. |
| 2008/0285565 | A1* | 11/2008 | Gunther ................... 370/394 |
| 2009/0016504 | A1* | 1/2009 | Mantell et al. ......... 379/101.01 |
| 2009/0275315 | A1 | 11/2009 | Alston |
| 2010/0010892 | A1* | 1/2010 | Kaneyoshi ............... 705/14.49 |
| 2011/0171932 | A1* | 7/2011 | Myllynen et al. ......... 455/410 |
| 2011/0202408 | A1* | 8/2011 | Kalliola ................. 705/14.64 |

FOREIGN PATENT DOCUMENTS

| | | |
|---|---|---|
| DE | 10061984 A1 | 6/2002 |
| EP | 1 073 293 A1 | 1/2001 |
| EP | 1 109 371 A2 | 6/2001 |
| EP | 1 220 132 A2 | 7/2002 |
| EP | 1 239 392 A2 | 9/2002 |
| EP | 1 365 604 A2 | 11/2003 |
| EP | 1 408 705 A1 | 4/2004 |
| EP | 1 455 511 A1 | 9/2004 |
| EP | 1 542 482 A2 | 6/2005 |
| EP | 1587332 A1 | 10/2005 |
| EP | 1 615 455 A1 | 1/2006 |
| EP | 1 633 100 A1 | 3/2006 |
| EP | 1 677 475 A1 | 7/2006 |
| GB | 2 369 218 A | 5/2002 |
| GB | 2 406 996 A | 4/2005 |
| GB | 2 414 621 A2 | 11/2005 |
| JP | 2002/140272 | 5/2002 |
| JP | 2007-087138 A | 4/2007 |
| JP | 2007-199821 A | 8/2007 |
| WO | WO 96/24213 | 8/1996 |
| WO | WO 00/44151 A2 | 7/2000 |
| WO | WO 01/22748 A1 | 3/2001 |
| WO | WO 01/31497 A1 | 5/2001 |
| WO | WO 01/50703 A2 | 7/2001 |
| WO | WO 01/52161 A2 | 7/2001 |
| WO | WO 01/57705 A1 | 8/2001 |
| WO | WO 01/58178 A2 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/91400 A2 | 11/2001 |
| WO | WO 01/93551 A2 | 12/2001 |
| WO | WO 01/97539 A2 | 12/2001 |
| WO | WO 02/31624 A2 | 4/2002 |
| WO | WO 02/054803 A1 | 7/2002 |
| WO | WO 02/069585 A2 | 9/2002 |
| WO | WO 02/069651 A1 | 9/2002 |
| WO | WO 02/075574 A1 | 9/2002 |
| WO | WO 02/084895 A1 | 10/2002 |
| WO | WO 03/015430 A1 | 2/2003 |
| WO | WO 03/019845 A2 | 3/2003 |
| WO | WO 03/024136 A1 | 3/2003 |
| WO | WO 03/049461 A2 | 6/2003 |
| WO | WO 03/088690 A1 | 10/2003 |
| WO | WO 2004/084532 A1 | 9/2004 |
| WO | WO 2004/086791 A1 | 10/2004 |
| WO | WO 2004/100470 A1 | 11/2004 |
| WO | WO 2004/100521 A1 | 11/2004 |
| WO | WO 2004/102993 A1 | 11/2004 |
| WO | WO 2004/104867 A2 | 12/2004 |
| WO | WO 2005/029769 A1 | 3/2005 |
| WO | WO 2005/076650 A1 | 8/2005 |
| WO | WO 2006/002869 A1 | 1/2006 |
| WO | WO 2006/005001 A2 | 1/2006 |
| WO | WO 2006/016189 A1 | 2/2006 |
| WO | WO 2006/027407 A1 | 3/2006 |
| WO | WO 2006/040749 A1 | 4/2006 |
| WO | WO 2006/093284 A1 | 9/2006 |
| WO | WO 2006/119481 A2 | 11/2006 |
| WO | WO 2007/083301 A1 | 7/2007 |
| WO | WO 2008/013437 A1 | 1/2008 |
| WO | WO 2008/045867 A1 | 4/2008 |
| WO | WO 2008/147919 A1 | 12/2008 |

OTHER PUBLICATIONS

Combined Search and Examination Report dated Apr. 21, 2008 issued by the UK Intellectual Property Office in connection with the related British Application No. GB 0724872.7. (6 pages).

Statement in accordance with the Notice from the European Patent Office dated Oct. 1, 2007 concerning business method (OJ FOP Nov. 2007, pp. 592-593) XP002456414.

* cited by examiner

200 - Server Apparatus
201 - Reception Interface
202 - Transmission Interface
203 - Processor
204 - Memory Element
205 - I/O Interface
206 - Interface Unit
221 - Message

METHOD AND ARRANGEMENT FOR ADDING DATA TO MESSAGES

CROSS-REFERENCE TO RELATED APPLICATIONS

This is a National Phase application of PCT International Application No. PCT/EP2008/068200 filed Dec. 22, 2008, which claims priority from U. K. Application No. GE 0724872.7 filed Dec. 21, 2007, the entire disclosure of each of which is incorporated herein by reference.

FIELD OF THE INVENTION

The invention relates generally to a method and arrangement for adding data to messages that are transferred in a communication network. Furthermore, the invention relates to a server apparatus, a database, and a computer program for adding data to messages that are transferred in a communication network.

BACKGROUND

Conventional methods for delivering advertisement data typically involve broadcasting messages to mass markets. This is usually described as a "Spray and Pray" approach, wherein the advertisement data is delivered to a wide audience and it is hoped that the advertisement data will be received by a sufficient number of potential consumers that are appropriate targets of the advertisement. Although an advertiser may take steps to ensure that the advertisement data is delivered via channels that traditionally are expected to reach a significant concentration of potential consumers, there is nevertheless little or no means to guarantee that the advertisement data is delivered to most appropriate recipients. An example of conventional mass marketing strategy is delivery of advertisement data through television channels and inclusion of the advertising data into commonly visited Internet websites.

Direct mailing campaigns via traditional mail and via electronic mail are considered to be more accurate in delivering advertisement information to targeted individuals and/or groups. In addition to the conventional electronic mail it is possible to use other electronic message delivery means for delivery of advertisement data, for example SMS-messages (Short Message Service) or MMS-messages (Multi Media Service) that can be delivered via a cellular mobile network. In conjunction with the electronic message delivery means there are two main principles to deliver advertisement data to targeted individuals and/or groups. The advertisement data can be delivered in dedicated advertisement messages or the advertisement data can be added as extra information to other messages that are transferred during a communication session between two or more entities, e.g. the advertisement data can be added to the end of an SMS-message. An entity that is participating a communication session can be e.g. an individual persons or a service. A communication session can be e.g. a person-to-person communication session between two or more persons or a service-to-person communication session in which a server system sends messages to one or more person and/or a person sends messages to the server system. When the advertising data is attached to delivery of other data transmission between entities there is a need to determine which piece of advertisement data is attached to a certain message.

In a solution according to the prior art, a decision to add a certain piece of advertisement data to certain a message is based on a content of the message. For example, if a content of the message is "See you at the mall soon" an advertising system is able to conclude on the basis of the word "mall" that the recipient of the message will probably go to a place where he/she will walk around and, as a consequence, may get thirsty and where it is possible to purchase beverages. Therefore, the advertising system may add the following advertisement data "Drink cool softdrinks" to the end of the message. In many cases a content of a message can be, however, quite non-informative. For example, a content of a response message to the above-mentioned message can be just a brief expression such as "Ok" from which it is hard or even impossible to draw any useful conclusions.

In another solution according to the prior art, a decision to add a certain piece of advertisement data to a certain message is based on profiling related to a sender of the message, to a recipient of the message, and/or to a group or the like to which the sender and/or the recipient belongs. The profiling is accomplished on the basis of information carried by or related to the message. An advertising system or any other system that is arranged to add extra information to messages that are transferred in a communication network should not cause excessive delays in delivery of the messages. Therefore, it is a quite challenging task to accomplish, within a time interval a message is allowed to be held in a server apparatus of an advertising system, a sufficient profiling related to the sender, to the recipient, and/or to the group. Therefore, the amount of work related to selection of an appropriate piece of extra information for a certain message may be too high with respect to the available time.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with at least one embodiment of the invention, a method, an arrangement, a server apparatus, a database, and a computer program are provided for supporting and/or implementing functionality for adding information to messages that are transferred in a communication network to provide auxiliary content in conjunction with delivery of the messages, wherein the selection of data to be added to a message is based on a pre-defined set of data items and a pre-defined set of profile items as specified in the independent claims, a single data item representing a piece of information that can be added to a message and a single profile item representing a characterisation and/or identification of an entity related to a message, e.g. a person, a group of persons, or an organization. The supporting and/or the implementation of the functionality for adding information to messages is achieved by a combination of features recited in each independent claim. Accordingly, dependent claims prescribe further detailed implementations of the present invention.

Various exemplifying embodiments of the invention together with additional objects and advantages will be best understood from the following description of specific embodiments when read in connection with the accompanying drawings.

The exemplifying embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

An arrangement according to an embodiment of the invention for adding data to messages that are transferred in a communication network comprises: (i) means for storing a pre-defined set of data items and a pre-defined set of profile items, each profile item being associated with one or more of the data items, (ii) means for receiving a message from the communication network, (iii) means for selecting, from the pre-defined set of profile items, a profile item on the basis of transmission control data associated with the message, (iv) means for selecting, from the pre-defined set of data items, at least one data item on the basis of the selected profile item, (v) means for adding the at least one data item to the message, and (vi) means for transmitting the message to the communication network.

Figure 1:
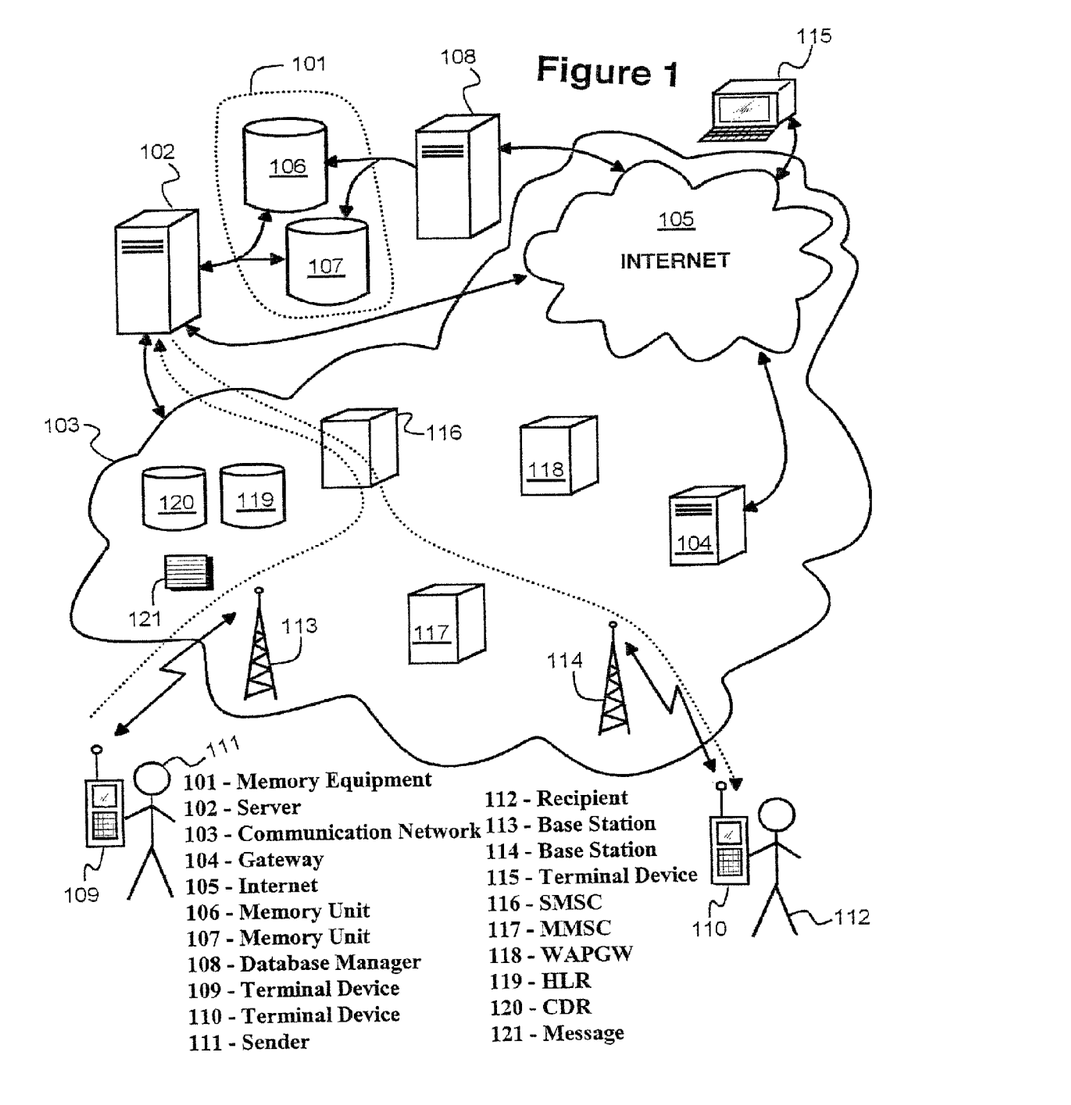
FIG. 1 shows an arrangement according to an embodiment of the invention for adding data to messages that are transferred in a communication network.

FIG. 1 shows an arrangement according to an embodiment of the invention for adding data to messages that are transferred in a communication network 103. The arrangement comprises memory equipment 101 that is arranged to store a database that includes a pre-defined set of data items and a pre-defined set of profile items. Each profile item is associated with one or more of the data items. A single data item represents a piece of extra information, e.g. advertisement data, that can be added to a message 121 when the message is delivered from a terminal device 109 of a sender 111 to a terminal device 110 of a recipient 112 via the communication network 103. The memory equipment 101 can be composed of one or more memory units 106, 107 that can be physically located in a centralised or distributed manner. The arrangement comprises a server 102 that includes a reception interface capable of receiving the message 121 from the communication network 103 and a transmission interface capable of transmitting the message back to the communication network to be delivered to the recipient 112. The server 102 is arranged to select, from the pre-defined set of profile items, a profile item on the basis of transmission control data associated with the message 121. The server 102 is arranged to select, from the pre-defined set of data items, at least one data item on the basis of the selected profile item, and to add the at least one data item to the message before the message is sent back to the communication network 103.

The word "communication network" has to be understood in a broad sense such that the communication network 103 can be seen to comprise also those devices that are, for example, between the server 102 and a cellular mobile network and/or between the server 102 and a landline network and/or between the server 102 and a local area network, etc. Furthermore, it should be noted that even if the server is able to receive the message 121, the server does not represent a final destination of the message but the server is arranged to intercept and modify the message that is being delivered to its destination.

The transmission control data associated with the message 121 represents information that is used by the communication network 103 for delivering and/or routing the message to an appropriate destination, i.e. to the recipient 112. The transmission control data can be, for example, a destination address of the message or a destination region of the message. The destination address can be e.g. an IP-destination address (Internet Protocol) or a recipient's phone number. The destination region can be e.g. an IP-destination subnet to which the message is being directed. A single profile item can be a characterisation or identification of an entity, e.g. person, a group of persons, or an organization, that is related to a certain instance of transmission control data, e.g. to a certain IP-address or a phone number. For example, the profile item that is selected on the basis of the transmission control data of the message 121 can be, for example, a characterisation or identification of the recipient 112, of a group to which the recipient belongs, and/or of an organisation to which the recipient belongs. In the above-described arrangement, profiling of entities associated with different instances of transmission control data has been done in advance and the results are stored in the database in the form of the profile items. Therefore, the amount of work related to selection of an appropriate piece of extra information for a certain message can be reduced.

In an arrangement according to an embodiment of the invention the server 102 is arranged to select, on the basis of a pre-determined selection rule, the at least one data item that is to be added to the message 121 from those data items that are associated with the selected profile item. For example, it can be possible that N different data items are associated with the selected profile item and M data items out of the said N data items (M<N) is/are wanted to be added to the message 121.

In an arrangement according to an embodiment of the invention the server 102 is arranged to select the at least one (M) data item at least partly on the basis of temporal order of last selections of the N data items associated with the selected profile item. An earlier last selection is preferably a factor in favour of getting selected compared with a later last selection. In other words, a data item for which a longer time has elapsed after its last selection is given at least partial precedence in the selection compared with another data item for which a shorter time has elapsed after its last selection. Another factor that can be taken into account in the selection can be, for example, a price that an advertiser or another user of the arrangement is willing to pay for each delivery of his data item. If only one data item (M=1) is selected to be added to the message and the selection is based only on the temporal order of last selections of the N data items associated with the selected profile item, the selection is actually performed in this embodiment of the invention according to the known Round-Robin selection principle.

In practice, it is difficult to predict an amount of messages that will be delivered to the recipient 112 within a certain time interval. Therefore, it is difficult to promise to an advertiser or another user of the arrangement that a certain amount of deliveries of a certain data item, e.g. a certain advertisement data, to the recipient 112 takes place within the said time interval. In an arrangement according to an embodiment of the invention a validity period can be defined for a data item. A validity period of a data item indicates a time interval during which the data item is allowed to be used as extra information to be added to messages. A data item the validity period of which has not begun, i.e. the validity period is entirely in the future, or the validity period of which has entirely elapsed cannot be used as the extra information. The server 102 is arranged to select the at least one (M) data item at least partly on the basis of remaining portions of the validity periods of the N data items associated with the selected profile item. A remaining portion of a validity period is the temporal length of that part of the validity period that has not yet elapsed. A shorter (non-zero) remaining portion of validity period is preferably a factor in favour of getting selected compared with a longer remaining portion of validity period. In this embodiment of the invention, those data items whose validity periods are about to run out are preferably favoured in the selection. Therefore, a probability that a pre-defined amount of deliveries of a certain data item takes place within a validity period of the said data item can be increased.

In the exemplifying situation shown in FIG. 1, a user of the arrangement, e.g. an advertiser, can add data items, profile items, and other information to the database embodied in the memory equipment 101 via the Internet 105 by using a terminal device 115. A data item can be a piece of text, a picture, an audio clip, a video clip, a piece of html-data, a piece of xml-data, and/or a piece of xhtml-data. In an arrangement according to an embodiment of the invention the server 102 is arranged to construct and to update the database on the basis of information comprising data items, profile items, information associating particular transmission control data with a certain profile item, and/or information associating one or more of data items with a certain profile item. In an arrangement according to another embodiment of the invention, there is a separate database manager 108 that is arranged to construct and/or to maintain the data base. There can be plurality of advertisers and/or other users of the arrangement. Advertisers can refer to brand owner, service provider, advertisement agent, merchant or any other party that wants to provide information to consumers or other recipients of messages. Information contained in data items can be commercial such as product or service promotion or non commercial such as general information services. An advertiser or another user can book a campaign via a web interface from an advertisement management system that can be implemented e.g. with the server 102 and/or with the separate database manager 108.

In an arrangement according to an embodiment of the invention the server 102 is arranged to use a pre-determined algorithm for calculating score values for the N data items associated with the selected profile item and to select the at least one (M) data item on the basis of the score values. Each of the N data items associated with the selected profile item has an own, data item specific score value.

In an arrangement according to an embodiment of the invention the server 102 is arranged to calculate a score value S according to the following formula:

$$S=(W1\times(A1-DE)+W2\times(A2-DT)+W3\times(A3+DQ)+W4\times(A4+TQ)+W5\times(A5-SZ)+A6)\times L, \quad (1)$$

where DE is arranged to indicate a number of remaining days within which a data item that is related to the score value S is allowed to be added to messages, DT is arranged to indicate a length of a remaining time interval within a current day and within which the data item that is related to the score value S is allowed to be added to messages, DQ is arranged to indicate a number of remaining messages to which the data item that is related to the score value S is allowed to be added within the current day (a remaining daily quota), TQ is arranged to indicate a total number of remaining messages to which the data item that is related to the score value S is allowed to be added (a remaining total quota), SZ is arranged to indicate a size of the data item that is related to the score value S, A1-A6 are pre-determined biasing values, and W1-W5 are pre-determined weighting factors. L is a factor that can be used for scaling the score value S according to a pre-determined scaling rule. For example, the factor L can be used for decreasing the score value S down to zero if the data item related to the score value S is the one that was selected in the previous time when there was a same selected profile item. When the data item is added to a message, TQ and DQ are decremented with one.

It should be noted that the formula (1) represents only one example of a pre-determined algorithm for calculating the score values. The above-presented formula (1) has to be understood in a sense that any of the pre-determined biasing values A1-A6 and of the pre-determined weighting factors W1-W5 can be also zero, i.e. a formula that used for calculating the score values can be, inter alia, a simplification of the formula (1).

In an arrangement according to an embodiment of the invention the server 102 is arranged to select a data item (data items) that has (have) a greatest score value (greatest score values) from the N data items associated with the selected profile item to be the at least one data item that is added to the message. If, for example, the biasing value A6 is increased for a certain data item, this data item is given relative precedence in the selection. Hence, the biasing factor A6 can be used for taking into account e.g. a fact that some advertisers or other users of the arrangement are willing to pay more for each delivery of a data item than some other advertisers. When two or more data items associated with the selected profile item get a same score value, the at least one data item can be selected randomly or on the basis of times of entry to the database, e.g. according to the FIFO or LIFO-principle (First In—First Out, Last In—First Out).

In an arrangement according to an embodiment of the invention the communication network 103 comprises a cellular mobile network. The communication network can be capable of supporting, for example, one or more of the following communication protocols: GSM (Global System Mobile), WCDMA (Wideband Code Division Multiple Access), GPRS (General Packet Radio Service). In addition to or instead of the cellular mobile network, a local area network such as a Wireless Local area network (WLAN) or BlueTooth® (BT) and/or other technologies such as WiMax, Broadcasting over DVB-H (Digital Video Broadcasting-Handhelds), ISDB-T (Integrated Services Digital Broadcasting for Terrestrial television broadcasting), DMB (Digital Media Broadcasting) or broadcasting over cellular can be used to deliver messages. The communication network 103 can be also a combination of two or more technologies i.e. hybrid communication network. The communication network can also be arranged to support generic Internet access using any transport methods.

The communication network 103 can comprise network elements such as a home location register (HLR) 119, call detail records (CDR) 120, a short message service centre (SMSC) 116, a multimedia message service center (MMSC) 117, a wireless application protocol gateway (WAPGW) 118, and a gateway 104 arranged to provide access to internet services provided with the aid of the Internet 105. In addition, the communication network 103 can comprise elements such as billing system (not shown), base stations 113, 114 and other elements, interfaces and functions needed to operate the communication network.

The terminal device 109 of the sender 111 and also the terminal device 110 of the recipient 112 can be, for example, a mobile terminal device such as a mobile phone, a smart phone, a personal digital assistant (PDA), a personal computer (PC), a laptop or a multimedia computer. Typically these terminal devices have capability to communicate with one or more different type of communication networks and have messaging capabilities in form of messaging client such as short message service (SMS) client or electronic mail client or multimedia message service client embedded in the terminal device. The terminal devices 109 and 110 can also have browser to access the Web-services and/or to WAP-services (Wireless Application Protocol).

In an arrangement according to an embodiment of the invention the server 102 is integrated into one of the following: the SMSC 116, the MMSC 117, an IMS-server (an intelligent messaging system server), an IM-system (instant messaging), and an electronic mail server.

In an arrangement according to an embodiment of the invention the message 121 is one of the following: an SMS-message (Short Message Service), an MMS-message (Multi Media Service), an IP-datagram (Internet Protocol), and an email letter (electronic mail).

In an arrangement according to an embodiment of the invention the transmission control data that is associated with the message 121 and that is used for selecting a profile item is one of the following: an IP-destination address (Internet Protocol) of the message, a destination phone number of the message, and an IP-destination subnet of the message.

In an arrangement according to an embodiment of the invention the server 102 is arranged to maintain counter values for the data items. Each data item has an own, data item specific counter value. The server is arranged to increment a counter value of a data item as a response to a situation in which the data item is added to a message. The counter values can be used for billing advertisers and other users of the arrangement.

A database according to an embodiment of the invention includes a predefined set of data items and a pre-defined set of profile items. Each profile item is associated with one or more of the data items and each profile item is selectable from the pre-defined set of profile items on the basis of transmission control data associated with a message. The database can be stored in distributed or centralised memory equipment.

A database according to an embodiment of the invention further includes information that is arranged to define a temporal length LVP and a temporal starting point SVP for a validity period of each data item.

A database according to an embodiment of the invention further includes information that is arranged to define, for each data item, values of the weighting factors W1-W5 and of the biasing values A1-A6 that are related to the score value calculating formula (1).

An extract from an exemplifying database according to an embodiment of the invention is shown in Table 1 below (Pi=profile item i, Di=data item I, i=integer):

TABLE 1

| ... | ... | ... | ... | ... |
|---|---|---|---|---|
| P1 | D1 | LVP1, SVP1 | W11...W51 | A11...A61 |
|  | D2 | LVP2, SVP2 | W12...W52 | A12...A62 |
|  | D3 | LVP3, SVP3 | W13...W53 | A13...A63 |

TABLE 1-continued

| P2 | D1 | LVP1, SVP1 | W11...W51 | A11...A61 |
|---|---|---|---|---|
|  | D4 | LVP4, SVP4 | W14...W54 | A14...A64 |
|  | D3 | LVP3, SVP3 | W13...W53 | A13...A63 |
|  | D5 | LVP5, SVP5 | W15...W54 | A15...A64 |
| P3 | D1 | LVP1, SVP1 | W11...W51 | A11...A61 |
| ... | ... | ... | ... | ... |

In the exemplifying database, data items D1, D2, and D3 are associated with a profile item P1, data items D1, D3, D4, and D5 are associated with a profile item P2, and the data item D1 is associated with a profile item P1. A temporal length of a validity period of the data item D1 is LVP1, a temporal starting point of a validity period of the data item D1 is SVP1, the weighting factors of Formula (1) for the data item D1 are W11 ... W51, and the biasing values of Formula (1) for the data item D1 are A11 ... A61. A temporal length of a validity period can be expressed e.g. in terms of hours and a temporal starting point of a validity period can be expressed e.g. as a date and a clock time.

A memory equipment according to an embodiment of the invention is arranged to store a database including a pre-defined set of data items and a pre-defined set of profile items, each profile item being associated with one or more of the data items and each profile item being selectable from the pre-defined set of profile items on the basis of transmission control data associated with a message received from a communication network.

In a memory equipment according to an embodiment of the invention the database further includes information that is arranged to define a length and a starting time for a validity period of each data item.

In a memory equipment according to an embodiment of the invention the database further includes information that is arranged to define, for each data item, values of the weighting factors W1-W5 and of the biasing values A1-A6 that are related to the score value calculating formula (1).

A server apparatus according to an embodiment of the invention comprises: (i) means for selecting, from a pre-defined set of profile items, a profile item on the basis of transmission control data associated with a message, and (ii) means for selecting, from a pre-defined set of data items, at least one data item to be added to the message on the basis of the selected profile item.

Figure 2:
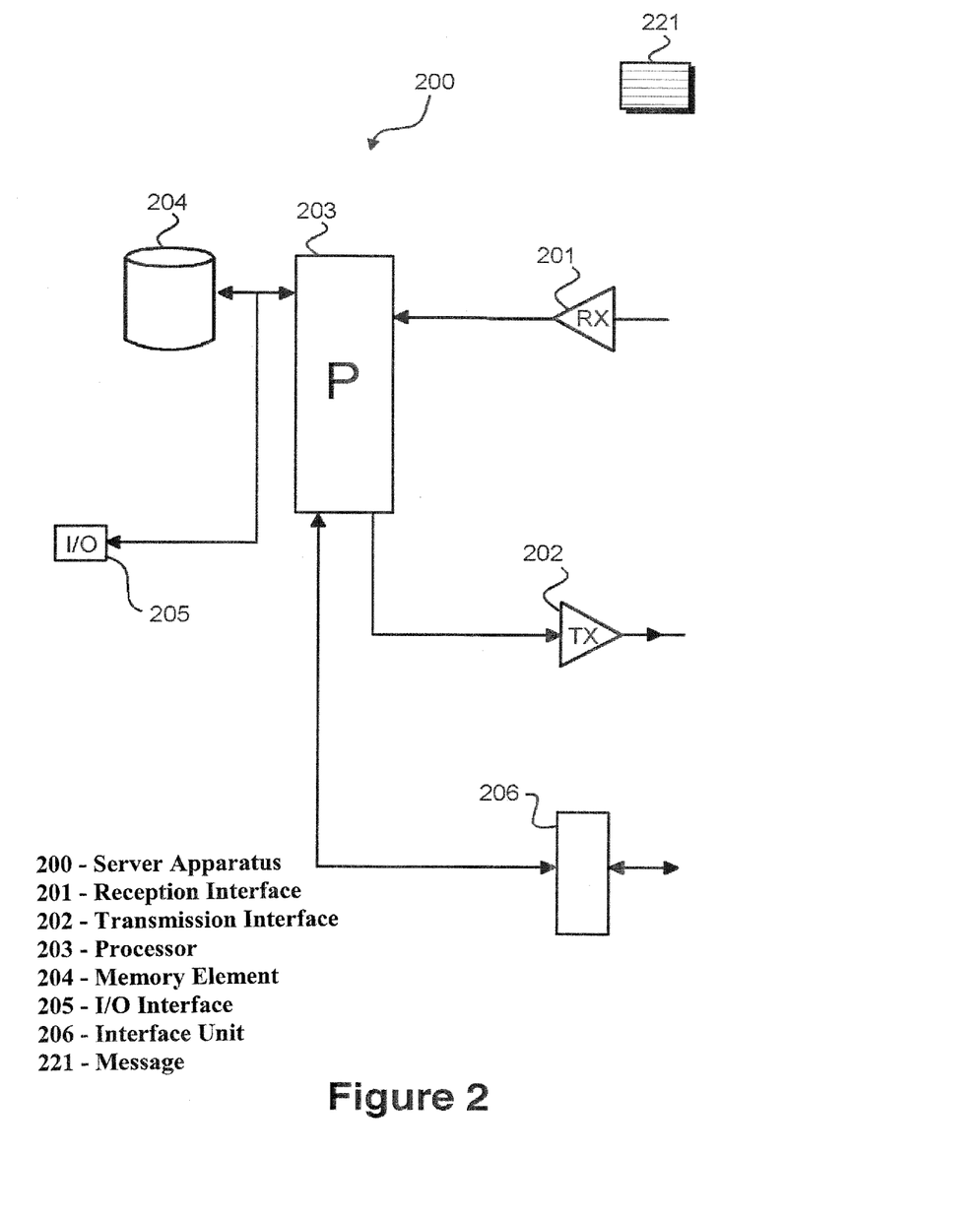
FIG. 2 shows a server apparatus according to an embodiment of the invention for adding data to messages that are transferred in a communication network.

FIG. 2 shows a server apparatus 200 according to an embodiment of the invention for adding data to messages that are transferred in a communication network. The server apparatus comprises a reception interface 201 that is capable of receiving transmission control data that is associated with a message 221. The server apparatus comprises a processor 203 that is arranged (i) to select, from a pre-defined set of profile items, a profile item on the basis of the transmission control data associated with the message 221, and (ii) to select, from a pre-defined set of data items, at least one data item to be added to the message 221 on the basis of the selected profile item. The server apparatus can comprise a memory element 204 for storing a database that includes the pre-defined set of profile items and the pre-defined set of data items. The server apparatus can, as well, comprise an input-output interface 205 for connecting to an external memory element that is arranged to contain the database including the pre-defined set of profile items and the pre-defined set of data items. The server apparatus can further comprise an interface unit 206 that is arranged to connect the server apparatus to the Internet.

In a server apparatus according to an embodiment of the invention the reception interface 201 is capable of receiving the message 221, the processor 203 is arranged to add the selected at least one data item to the message 221, and there is a transmission interface 202 capable of transmitting the message that has been provided with the selected at least one data item. A server apparatus according to another embodiment of the invention is arranged to transmit the at least one data item or a pointer to the at least one data item to another apparatus that may be used for adding the at least one data item to the message 221 and for transmitting the message that has been provided with the selected at least one data item.

The server apparatus 200 can be a single device within a single housing or it can comprise several interconnected devices. The processor 203 can be a single processor unit or the processor 203 can comprise several processor units that can be physically located in a centralized manner or in a distributed manner.

In a server apparatus according to an embodiment of the invention the processor 203 is arranged to select, on the basis of a pre-determined selection rule, the at least one data item that is to be added to the message 221 from those data items that are associated with the selected profile item.

In a server apparatus according to an embodiment of the invention the processor 203 is arranged to select the at least one data item at least partly on the basis of remaining portions of validity periods of the data items associated with the selected profile item. A shorter remaining portion of validity period is preferably a factor in favour of getting selected compared with a longer remaining portion of validity period.

In a server apparatus according to an embodiment of the invention the processor 203 is arranged to select the at least one data item at least partly on the basis of temporal order of last selections of the data items associated with the selected profile item. An earlier last selection is preferably a factor in favour of getting selected compared with a later last selection.

In a server apparatus according to an embodiment of the invention the processor 203 is arranged to maintain counter values for the data items associated with the selected profile item, to select the at least one data item that is to be added to the message on the basis of the counter values, and to decrease a counter value of the at least one data item with an pre-determined decrement value. Each of the data items associated with the selected profile item has an own counter value and an own pre-determined decrement value. A data item (data items) having a greatest counter value (greatest counter values) can be selected from the data items associated with the selected profile item. By selecting different decrement values for different data items it is possible to adjust a ratio of selection frequencies of the different data items. As well it is possible to select a data item (data items) having a smallest counter value (smallest counter values) and to increase a counter value of a data item with pre-determined increment value when the data item is added to the message.

In a server apparatus according to an embodiment of the invention the processor 203 is arranged to use a pre-determined algorithm for calculating score values for the data items associated with the selected profile item and to select the at least one data item on the basis of the score values, each of the data items associated with the selected profile item having an own score value.

In a server apparatus according to an embodiment of the invention the processor 203 is arranged to calculate the score values according to the formula:

$$S=(W1\times(A1-DE)+W2\times(A2-DT)+W3\times(A3+DQ)+W4\times(A4+TQ)+W5\times(A5-SZ)+A6)\times L,$$

where DE is arranged to indicate a number of remaining days within which a data item that is related to a score value S is allowed to be added to the message, DT is arranged to indicate a length of a remaining time interval within a current day and within which the data item that is related to the score value S is allowed to be added to the message, DQ is arranged to indicate a number of remaining messages to which the data item that is related to the score value S is allowed to be added within the current day, TQ is arranged to indicate a total number of remaining messages to which the data item that is related to the score value S is allowed to be added, SZ is arranged to indicate a size of the data item that is related to the score value S, A1-A6 are pre-determined biasing values, W1-W5 are pre-determined weighting factors, and L is a factor for scaling the score value S according to a pre-determined scaling rule. For example, the factor L can be used for decreasing the score value S down to zero if the data item related to the score value S is the one that was selected in the previous time when there was a same selected profile item. Any of the pre-determined biasing values A1-A6 and of the pre-determined weighting factors W1-W5 can be also zero, i.e. a formula that is used for calculating the score values can be a simplification of the above formula. Preferably the score values are calculated when a data item has been added to a message, and/or when a temporal parameter material to the score value changes (e.g. when a day has passed), and/or when a data item is added to the database so that the score values are available for immediate look-up the next time a message is received.

In a server apparatus according to an embodiment of the invention the processor 203 is arranged to select a data item (data items) that has (have) a greatest score value (greatest score values) from the data items associated with the selected profile item to be the at least one data item that is to be added to the message 221.

In at least one embodiment of the invention, the server apparatus has access to a threshold value, which is for use in the determination of selection of data items. The server apparatus compares, for each data item, respectively generated score values and compares them against the threshold. In the event that the score values of all the data items are lower than the threshold, the server apparatus can be arranged to perform a correlation process, whereby it identifies one or more profile items having a predetermined match with the profile item corresponding to the transmission data of the message 221. Then, score values for data items associated with the, or each, profile item so identified are compared against the threshold, and if the score values exceed the threshold by a predetermined amount (e.g. an amount that accounts for the fact that the profile item is not precisely that associated with the transmission data), a data item from what is essentially a different pool of data items is selected for addition to the message 221.

The above variant, namely involving selection of a data item from a pool of data items corresponding to a profile item other than precisely the profile item matching the transmission data of the message 221, could be applied in situations in which there are no data items in the database available corresponding to the profile item.

In a server apparatus according to an embodiment of the invention the processor 203 is arranged to use a pre-determined default profile item as the selected profile item as a response to a situation in which the transmission control data associated with the message is unable to determine a selection of any other profile item.

In a server apparatus according to an embodiment of the invention the processor 203 is arranged to remove an existing data item from the message before adding the selected at least one data item to the message.

A server apparatus according to an embodiment of the invention is arranged to construct and update the database that includes the pre-defined set of data items and the pre-defined set of profile items on the basis of information comprising at least one of the following: data items, profile items, information associating particular transmission control data with a certain profile item, and information associating one or more data items with a certain profile item.

In a server apparatus according to an embodiment of the invention the reception interface 201 is a serial port, e.g. a USB-port (Universal Serial Bus), or a parallel port that is adapted to receive digital data from an external device via a digital data link, and the transmission interface 202 is a serial port or a parallel port that is adapted to transmit digital data to an external device via a digital a data link.

In a server apparatus according to an embodiment of the invention the reception interface 201 and the transmission interface 202 are arranged to communicate with at least one of the following: a cellular mobile network and a local area network.

In a server apparatus according to an embodiment of the invention the reception interface 201 and the transmission interface 202 are arranged to support at least one of the following communication protocols: GSM (Global System Mobile), WCDMA (Wideband Code Division Multiple Access), GPRS (General Packet Radio Service).

In a server apparatus according to an embodiment of the invention the reception interface 201 and the transmission interface 202 are arranged to support at least one of the following communication protocols: WLAN (Wireless Local Area Network), BlueTooth®, and Wimax.

In a server apparatus according to an embodiment of the invention the message 221 can be an SMS-message (Short Message Service), an MMS-message (Multi Media Service), an IP-datagram (Internet Protocol), or an email letter (electronic mail).

In a server apparatus according to an embodiment of the invention the transmission control data that is used for selecting a profile data item can be an IP-destination address (Internet Protocol) of the message 221, a destination phone number of the message 221, or an IP-destination subnet of the message.

In a server apparatus according to an embodiment of the invention the processor 203 is arranged to maintain counter values for the data items. Each data item has an own, data item specific counter value. The processor is arranged to increment a counter value of a data item as a response to a situation in which the data item is added to the message. The counter values can be used e.g. for billing advertisers that have provided data items to be added to messages.

A server apparatus according to an embodiment of the invention is integrated into one of the following: a SMSC (a short message service centre), a MMSC (a multimedia message service center), an IMS-server (an intelligent messaging system server), an IM-system (instant messaging), and an electronic mail server.

Figure 3:
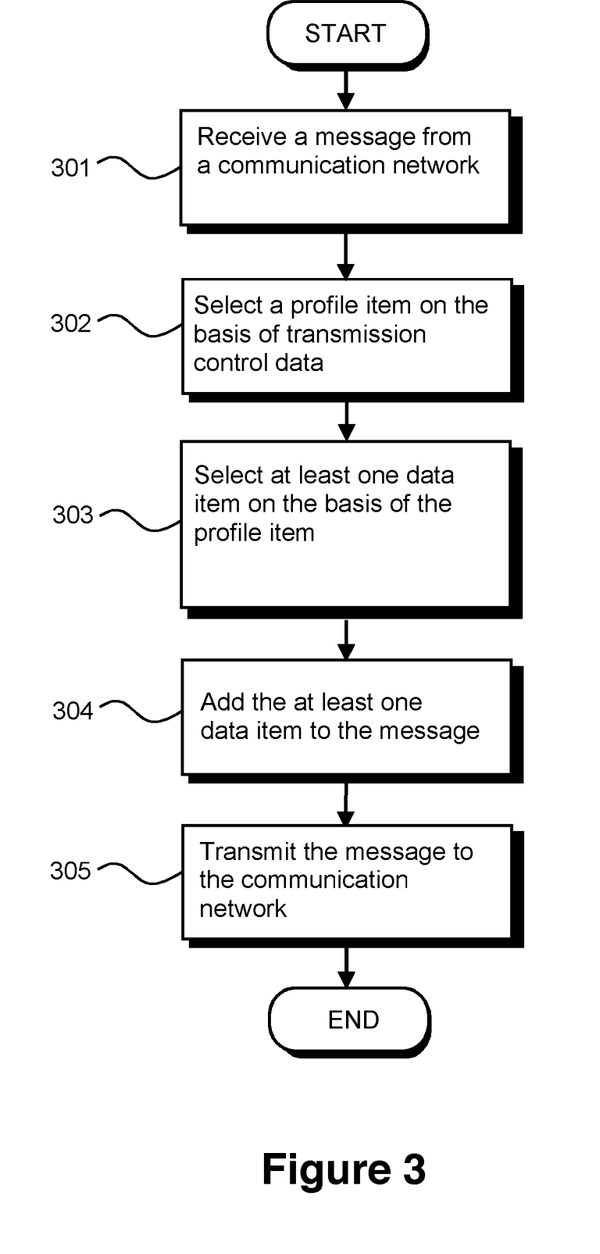
FIG. 3 shows a flow chart of a method according to an embodiment of the invention for adding data to messages that are transferred in a communication network.

FIG. 3 shows a flow chart of a method according to an embodiment of the invention for adding data to a message that is transferred in a communication network. A phase 301 comprises receiving the message from a communication network. A phase 302 comprises selecting, from a pre-defined set of profile items, a profile item on the basis of transmission control data associated with the message. A phase 303 comprises selecting, from a pre-defined set of data items, at least one data item on the basis of the selected profile item. A phase 304 comprises adding the at least one data item to the message. A phase 305 comprises transmitting the message to the communication network.

In a method according to an embodiment of the invention a pre-determined default profile item is used as the selected profile item as a response to a situation in which the transmission control data associated with the message is unable to determine a selection of any other profile item.

In a method according to an embodiment of the invention an existing data item is removed from the message before adding the selected at least one data item to the message.

In a method according to an embodiment of the invention at least one of the following communication protocols is used for receiving and transmitting the message: GSM (Global System Mobile), WCDMA (Wideband Code Division Multiple Access), GPRS (General Packet Radio Service), BlueTooth®, and Wimax.

In a method according to an embodiment of the invention the message is one of the following: an SMS-message (Short Message Service), an MMS-message (Multi Media Service), an IP-datagram (Internet Protocol), and an email letter (electronic mail).

In a method according to an embodiment of the invention the transmission control data associated with the message is one of the following: an IP-destination address (Internet Protocol) of the message, a destination phone number of the message, and an IP-destination subnet of the message.

In a method according to an embodiment of the invention counter values are maintained for the data items, each data item having an own counter value, and a counter value of the at least one data item is incremented as a response to a situation in which the at least one data item is added to the message. The counter values can be used e.g. for billing advertisers that have provided data items to be added to messages.

Figure 4:
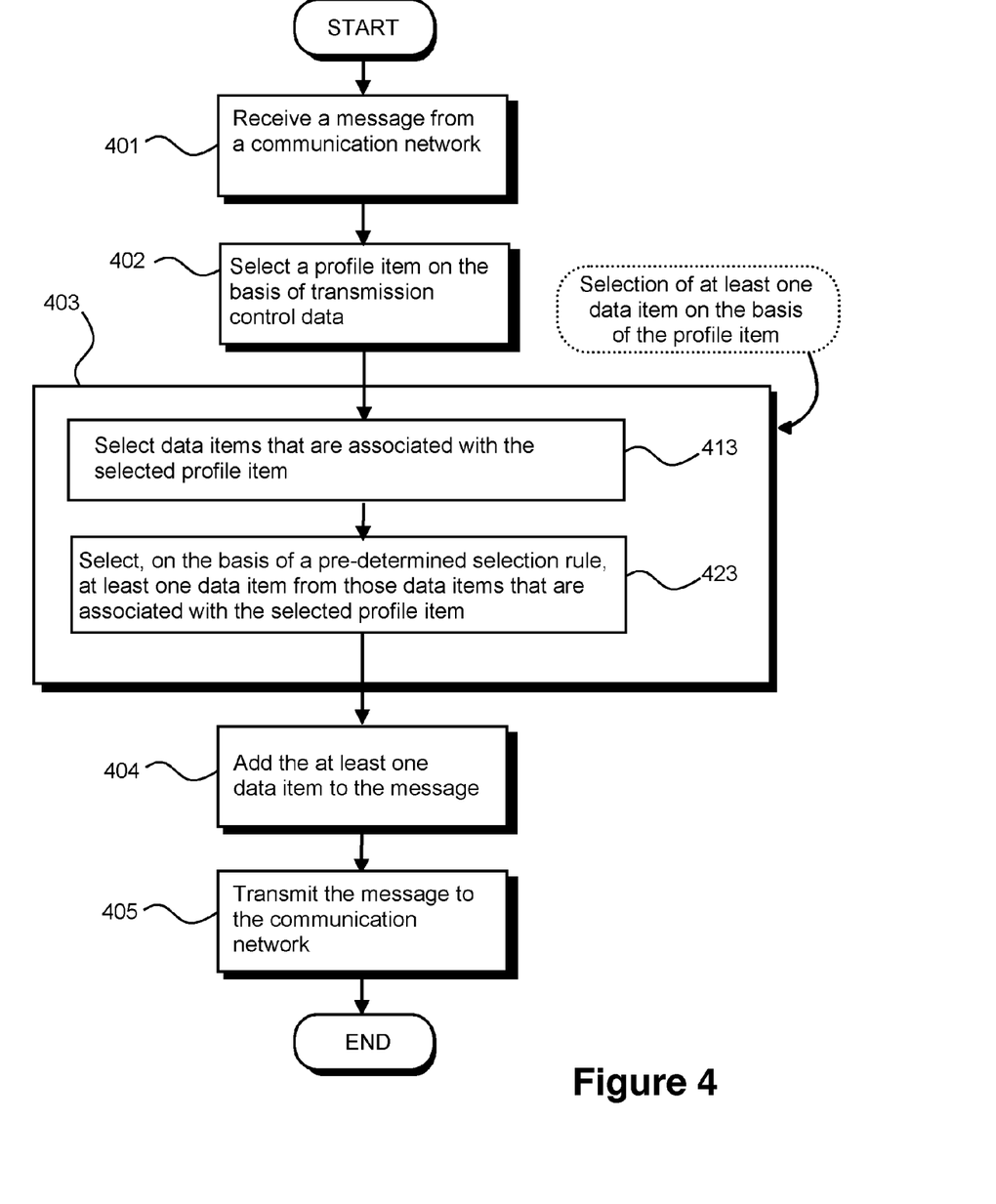
FIG. 4 shows a flow chart of a method according to an embodiment of the invention for adding data to messages that are transferred in a communication network.

FIG. 4 shows a flow chart of a method according to an embodiment of the invention for adding data to messages that are transferred in a communication network. A phase 401 comprises receiving the message from a communication network. A phase 402 comprises selecting, from a pre-defined set of profile items, a profile item on the basis of transmission control data associated with the message. A phase 403 comprises selecting, from a pre-defined set of data items, at least one data item on the basis of the selected profile item. A phase 404 comprises adding the at least one data item to the message. A phase 405 comprises transmitting the message to the communication network.

The phase 403 comprises sub-phases 413 and 414. The sub-phase 413 comprises selecting, from a pre-defined set of data items, those data items that are associated with the selected profile item. The sub-phase 423 comprises selecting, on the basis of a pre-determined selection rule, the at least one data item that is/are added to the message from the data items that are associated with the selected profile item.

In a method according to an embodiment of the invention, validity periods are defined for the data items. A validity period of a data item indicates a time interval during which the data item is allowed to be used as extra information to be added to messages. In a method according to an embodiment of the invention, the at least one data item is selected in the sub-phase 423 at least partly on the basis of remaining portions of validity periods of the data items associated with the selected profile item. A shorter remaining portion of validity period is preferably a factor in favour of getting selected compared with a longer remaining portion of validity period.

In a method according to an embodiment of the invention the at least one data item is selected in the sub-phase 423 at least partly on the basis of temporal order of last selections of the data items associated with the selected profile item. An earlier last selection is preferably a factor in favour of getting selected compared with a later last selection.

In a method according to an embodiment of the invention counter values are maintained for the data items associated with the selected profile item, the at least one data item that is added to the message is selected in the sub-phase 423 on the basis of the counter values, and a counter value of the at least one data item is decreased with an pre-determined decrement value. Each of the data items associated with the selected profile item has an own counter value and an own pre-determined decrement value. A data item (data items) having a greatest counter value (greatest counter values) is (are) selected in the sub-phase 423 from the data items associated with the selected profile item. By selecting different decrement values for different data items it is possible to adjust a ratio of selection frequencies of the different data items. As well it is possible to select a data item (data items) having a smallest counter value (smallest counter values) and to increase a counter value of a data item with pre-determined increment value when the data item is added to the message.

In a method according to an embodiment of the invention score values are calculated using a pre-determined algorithm for the data items associated with the selected profile item and the pre-determined number of data items are selected on the basis of the score values, each of the data items associated with the selected profile item having an own score value.

In a method according to an embodiment of the invention the score values are calculated according to the following formula:

$$S=(W1\times(A1-DE)+W2\times(A2-DT)+W3\times(A3+DQ)+W4\times(A4+TQ)+W5\times(A5-SZ)+A6)\times L,$$

where DE is arranged to indicate a number of remaining days within which a data item that is related to a score value S is allowed to be added to the message, DT is arranged to indicate a length of a remaining time interval within a current day and within which the data item that is related to the score value S is allowed to be added to the message, DQ is arranged to indicate a number of remaining messages to which the data item that is related to the score value S is allowed to be added within the current day, TQ is arranged to indicate a total number of remaining messages to which the data item that is related to the score value S is allowed to be added, SZ is arranged to indicate a size of the data item that is related to the score value S, A1-A6 are pre-determined biasing values, W1-W5 are pre-determined weighting factors, and L is a factor for scaling the score value S according to a pre-determined scaling rule. For example, the factor L can be used for decreasing the score value S down to zero if the data item related to the score value S is the one that was selected in the previous time when there was a same selected profile item. A data item (data items) that has (have) a greatest score value (greatest score values) is (are) selected in the sub-phase 423 from the data items associated with the selected profile item to be the at least one data item that is added to the message. As described above, optionally a threshold can be used to determine whether any of the data items corresponding to the profile item can be added to the message, and if none of the score values exceed the threshold, data items corresponding to a different profile item can be selected, in the manner described above. Any of the pre-determined biasing values A1-A6 and of the pre-determined weighting factors W1-W5 can be also zero, i.e. a formula that used for calculating the score values can be a simplification of the above formula.

A computer program product according to an embodiment of the invention comprises computer executable instructions for adding data to messages that are transferred in a communication network. The above-mentioned executable instructions are:
    computer executable instructions for making a programmable processor to select, from a pre-defined set of profile items, a profile item on the basis of transmission control data associated with a message, and
    computer executable instructions for making the programmable processor to select, from a pre-defined set of data items, at least one data item to be added to the message on the basis of the selected profile item.

A computer program product according to an embodiment of the invention further comprises computer executable instructions for making the processor to add the selected at least one data item to the message.

For example, the processor 203 of the server apparatus 200 shown in FIG. 2 can be the programmable processor.

The computer executable instructions can be e.g. subroutines and/or functions.

A computer program product according to an embodiment of the invention is stored in a computer readable medium. The computer readable medium can be e.g. a CD-ROM (Compact Disc Read Only Memory) or a RAM-device (Random Access Memory).

A computer program product according to an embodiment of the invention is carried in a signal that is receivable from a communication network.

While there have been shown and described and pointed out fundamental novel features of the invention as applied to embodiments thereof, it will be understood that various omissions and substitutions and changes in the form and details of the processes described may be made by those skilled in the art without departing from the spirit of the invention. For example, it is expressly intended that all combinations of those process steps which perform substantially the same function in substantially the same way to achieve the same results are within the scope of the invention. Moreover, it should be recognized that process steps shown and/or described in connection with any disclosed form or embodiment of the invention may be incorporated in any other disclosed or described or suggested form or embodiment as a general matter of design choice. The specific examples provided in the description given above should not be construed as limiting. Therefore, the invention is not limited merely to the embodiments described above, many variants being possible without departing from the spirit of the inventive idea defined in the independent claims.

The invention claimed is:

1. A server apparatus comprising a processor that is arranged:
    to select, from a pre-defined set of profile items, a profile item on the basis of transmission control data associated with a message, and
    to select, from a pre-defined set of data items, at least one data item to be added to the message on the basis of the selected profile item,
    wherein the processor is arranged to select the at least one data item at least partly on the basis of remaining portions of validity periods of the data items associated with the selected profile item, a shorter remaining portion of validity period being a factor in favour of getting selected compared with a longer remaining portion of validity period.

2. The server apparatus according to claim 1, wherein the processor is arranged to select the at least one data item at least partly on the basis of temporal order of last selections of the data items associated with the selected profile item, an earlier last selection being a factor in favour of getting selected compared with a later last selection.

3. The server apparatus according to claim 1, wherein the processor is arranged to use a pre-determined algorithm for calculating score values for the data items associated with the selected profile item and to select the at least one data item on the basis of the score values, each of the data items associated with the selected profile item having an own score value.

4. The server apparatus according to claim 3, wherein the processor is arranged to maintain counter values for the data items associated with the selected profile item, to use the counter values as the score values, and to update a counter value of the at least one data item with a pre-determined update value, each of the data items associated with the selected profile item having an own counter value and an own pre-determined update value.

5. The server apparatus according to claim 4, wherein the processor is arranged to increment a said counter value of the at least one data item as a response to a situation in which the at least one data items is added to the message.

6. The server apparatus according to claim 3, wherein the processor is arranged to calculate the score values according to the formula:

$$S=(W1\times(A1-DE)+W2\times(A2-DT)+W3\times(A3+DQ)+W4\times(A4+TQ)+W5\times(A5-SZ)+A6)\times L,$$

where DE is arranged to indicate a number of remaining days within which a data item that is related to a score value s is allowed to be added to the message, DT is arranged to indicate a length of a remaining time interval within a current day and within which the data item that is related to the score value S is allowed to be added to the message, DQ is arranged to indicate a number of remaining messages to which the data item that is related to the score value S is allowed to be added within the current day, TQ is arranged to indicate a total number of remaining messages to which the data item that is related to the score value S is allowed to be added, SZ is arranged to indicate a size of the data item that is related to the score value S, A1-A6 are pre-determined biasing values, W1-W5 are pre-determined weighting factors, and L is a factor for scaling the score value S according to a pre-determined scaling rule.

7. The server apparatus according to claim 1, wherein the processor is arranged to use a pre-determined default profile item as the selected profile item as a response to a situation in which the transmission control data associated with the message is unable to determine a selection of any other profile item.

8. The server apparatus according to claim 1, wherein the processor is arranged to select a data item on the basis of a profile item other than the profile item corresponding to the transmission control data, the processor being arranged to perform a profile correlation process in order to identify said other profile item.

9. The server apparatus according to claim 1, wherein the processor is arranged to remove an existing data item from the message before adding the selected at least one data item to the message.

10. The server apparatus according to claim 1, wherein the processor is arranged to update a database that is arranged to contain the pre-defined set of data items and the pre-defined set of profile items on the basis of information comprising at least one of the following:

a new data item, a new profile item, a change to temporal data material to select-ion of a said data item, information associating particular transmission control data with one of the profile items, and information associating one or more data items with one of the profile items.

11. The server apparatus according to claim 1, comprising as reception interface and a transmission interface that are arranged to communicate with at least one of the following: a cellular mobile network and a local area network.

12. The server apparatus according to claim 1, wherein the message is one of the following: a SMS-message (Short Message Service), an MMS-message (Multi Media Service), an IP-datagram (Internet Protocol), and an email letter (electronic mail).

13. The server apparatus according to claim 1, wherein the transmission control data associated with the message is one of the following:
   an IP-destination address (Internet Protocol) of the message, a destination phone number of the message, and an IP-destination subnet of the message.

14. The server apparatus according to claim 1, wherein the server apparatus is integrated into one of the following: a SMSC (a short message service centre), a MMSC (a multimedia message service center), an IMS-server (an intelligent messaging system server), an IM-system (instant messaging), and an electronic mail server.

15. The server apparatus according to claim 14, wherein the processor is arranged to add the at least one data item to the message.

16. A system comprising:
   memory equipment arranged to store a database including a pre-defined set of data items and a pre-defined set of profile items, each profile item being associated with one or more of the data items; and
   a server including a reception interface configured to receive a message from a communication network and a transmission interface configured to transmit the message to the communication network, wherein the server is arranged:
   to select, from the pre-defined set of profile items, a profile item on the basis of transmission control data associated with the message;
   to select, from the pre-defined set of data items, at least one data item on the basis of the selected profile item; and
   to add the at least one data item to the message, wherein the server is arranged to select the at least one data item at least partly on the basis of remaining portions of validity period of the data items associated with the selected profile item, a shorter remaining portion of validity period being a factor of getting selected compared with a longer remaining portion of validity period.

17. The system of claim 16, wherein the server is arranged to use a pre-determined algorithm for calculating score values for the data items associated with the selected profile item and to select the at least one data item on the basis of the score values, each of the data items associated with the selected profile item having an own score value.

18. The system of claim 17, wherein the server is arranged to calculate the score values according to the formula:

$$S=(W1\times(A1-DE)+W2\times(A2-DT)+W3\times(A3+DQ)+W4\times(A4+TQ)+W5\times(A5-SZ)+A6)\times L,$$

where DE is arranged to indicate a number of remaining days within which a data item that is related to a score value S is allowed to be added to the message, DT is arranged to indicate a length of a remaining time interval within a current day and within which the data item that is related to the score value S is allowed to be added to the message, DQ is arranged to indicate a number of remaining messages to which the data item that is related to the score value S is allowed to be added within the current day, TQ is arranged to indicate a total number of remaining messages to which the data item that is related to the score value S is allowed to be added, SZ is arranged to indicate a size of the data item that is related to the score value S, A1-A6 are pre-determined biasing values, W1-W5 are pre-determined weighting factors, and L is a factor for scaling the score value S according to a pre-determined scaling rule.

19. The system of claim 18, wherein the server is arranged to update the database on the basis of the information comprising at least one of the following: a new data item, a new profile item, a change to temporal data material to selection of a said data item, information associating particular transmission control data with one of the profile items, and information associating one or more data items with one of the profile items.

20. The system of claim 16, wherein the arrangement comprises a gateway device arranged to connect the server to the Internet.

21. A method comprising:
receiving a message from a communication network;
selecting, from a pre-defined set of profile items, a profile item on the basis of transmission control data associated with the message;
selecting, from a pre-defined set of data items, at least one data item on the basis of the selected profile item, the selected data item being for use in modifying the received message,
in which the at least one data item is selected at least partly on the basis of remaining-portions of validity periods of the data items associated with the selected profile item, a shorter remaining portion of validity being a factor in favour of getting selected compared with a longer remaining portion of validity period.

22. The method according to claim 21, comprising selecting the at least one data item at least partly on the basis of temporal order of last selections of the data items associated with the selected profile item, an earlier last selection being a factor in favour of getting selected compared with a later last selection.

23. The method according to claim 21, comprising calculating score values using a pre-determined algorithm for the data items associated with the selected profile item and in which the at least one data item is selected on the basis of the score values, each of the data items associated with the selected profile item having an own score value.

24. The method according to claim 23, wherein counter values are maintained for the data items associated with the selected profile item, the method comprising using the counter values as the score values, and updating a counter value of each data item that is selected to be added to the message with predetermined update value, each of the data items associated with the selected profile item having an own counter value and an own pre-determined update value.

25. The method according to claim 24, wherein the processor is arranged to increment a said counter value of the at least one data item as a response to a situation in which the at least one data item is added to the message.

26. The method according to claim 23, wherein the score values are calculated according to the formula:

$$S=(W1\times(A1-DE)+W2\times(A2-DT)+W3\times(A3+DQ)+W4\times(A4+TQ)+W5\times(A5-SZ)+A6)\times L,$$

where DE is arranged to indicate a number of remaining days within which a data item that is related to a score value S is allowed to be added to the message, DT is arranged to indicate a length of a remaining time interval within a current day and within which the data item that is related to the score value S is allowed to be added to the message, DQ is arranged to indicate a number of remaining messages to which the data item that is related to the score value S is allowed to be added within the current day, TQ is arranged to indicate a total number of remaining messages to which the data item that is related to the score value S is allowed to be added, SZ is arranged to indicate a size of the data item that is related to the score value S, A1-A6 are pre-determined biasing values, W1-W5 are pre-determined weighting factors! and L is a factor for scaling the score value S according to a pre-determined scaling rule.

27. The method according to claim 21, comprising using a pre-determined default profile item as the selected profile item as a response to a situation in which the transmission control data associated with the message is unable to determine a selection of any other profile item.

28. The method according to claim 21, comprising selecting a data item on the basis of a profile item other than the profile item corresponding to the transmission control data, the method further comprising performing a profile correlation process in order to identify said other profile item.

29. The method according to claim 21, wherein existing data item is removed from the message before adding the selected at least one data item to the message.

30. The method according to claim 21, wherein the transmission control data associated with the message is one of the following: an IP-destination address (Internet Protocol) of the message, a destination phone number of the message, and an IP-destination subnet of the message.

31. A computer program, or a suite of computer programs, embodied on non-transitory computer readable storage medium, comprising a set of instructions arranged to cause a computer, or a suite of computers, to execute a process according claim 21.

32. A non-transitory computer readable storage medium having stored thereon computer readable program code which, when executed by a computer system, causes said computer system to perform the method according to claim 21.

* * * * *